United States Patent [19]
Novak

[11] 3,848,987  
[45] Nov. 19, 1974

[54] CASSETTE TYPE SEQUENCE CAMERA

[75] Inventor: Warren D. Novak, Chappaqua, N.Y.

[73] Assignee: The Mosler Safe Company, Hamilton, Ohio

[22] Filed: May 14, 1973

[21] Appl. No.: 360,361

[52] U.S. Cl............... 354/212, 354/173, 354/204, 354/254, 354/275, 352/219, 352/72
[51] Int. Cl...... G03b 17/42, G03b 9/10, G03b 1/22
[58] Field of Search........... 95/31 EL, 11 R, 31 CA, 95/61; 352/121, 208, 219, 72, 166, 169; 242/71, 71.1, 207, 208

[56] References Cited
UNITED STATES PATENTS

| | | | |
|---|---|---|---|
| 1,464,327 | 8/1923 | Mladinich | 352/219 X |
| 2,609,998 | 9/1952 | Sear | 242/45 X |
| 2,627,381 | 2/1953 | Borgerg | 242/207 |
| 3,602,585 | 8/1971 | Steibl et al. | 352/208 X |
| 3,643,894 | 2/1972 | Kadowaki | 352/166 X |

Primary Examiner—Robert P. Greiner  
Attorney, Agent, or Firm—Wood, Herron & Evans

[57] ABSTRACT

A camera comprising a housing, a lens, a cassette mounted in the housing adjacent the lens, a rotary shutter mounted for rotation between the lens and cassette and an aperture plate mounted between the rotary shutter and cassette. A motor is connected by a pulley belt to the periphery of the rotary shutter to rotate the shutter. The shutter carries a cam which cooperates with a film advance mechanism mounted on the plate. The film advance mechanism includes a pin slidably mounted in a block, the pin riding in and out of slots in the film as the block is reciprocated by the cam to advance the film. A similar pin is slidably mounted on a block adjustably mounted on the plate to move in and out of the slots in the film, the pin being connected to a movable contact in a control circuit for the film. The rotary shutter also carries a friction wheel which engages a drive disc, the drive disc being connectable to the take-up reel in the cassette to take up the film as it is advanced through the camera.

5 Claims, 13 Drawing Figures

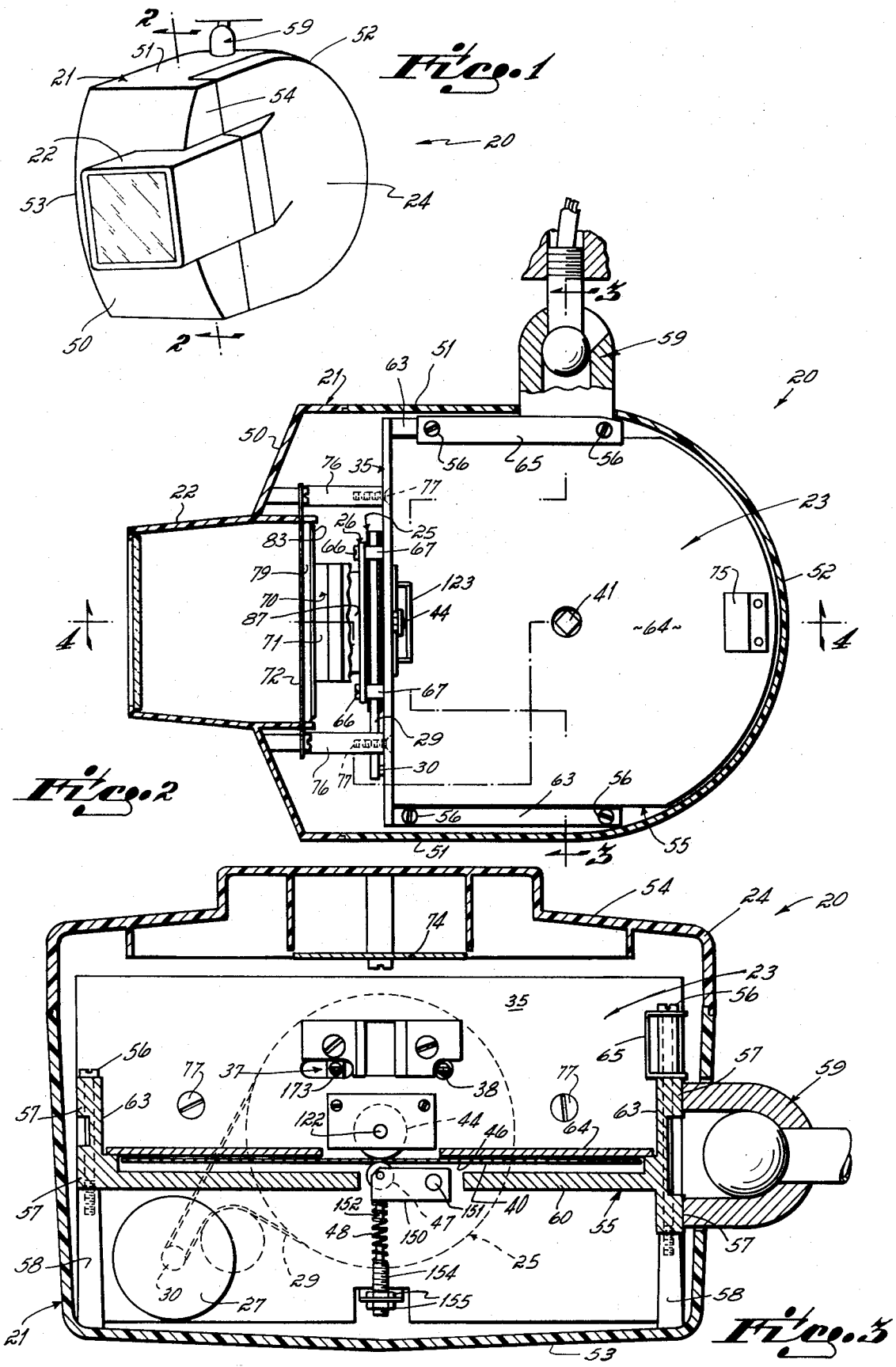

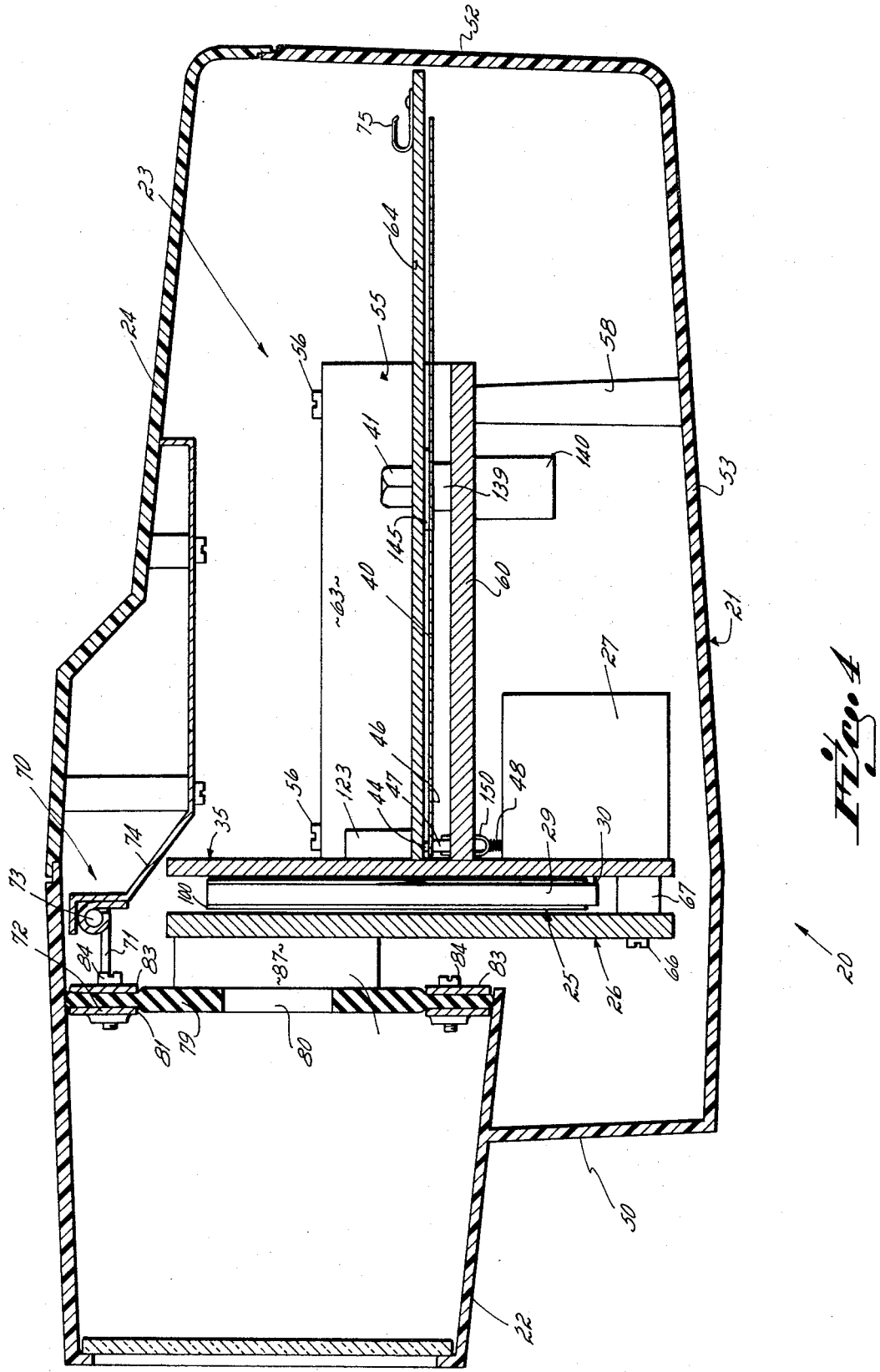

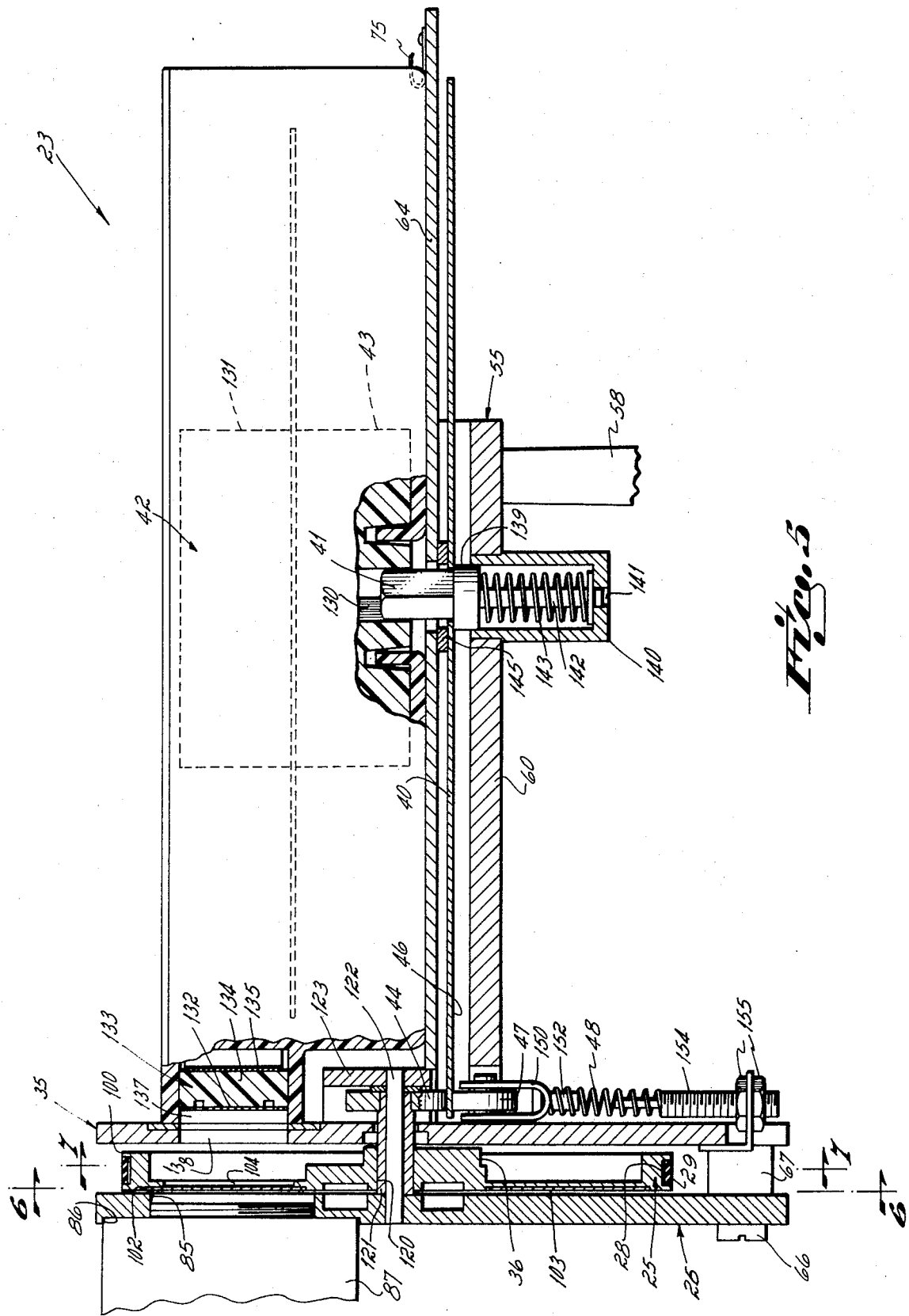

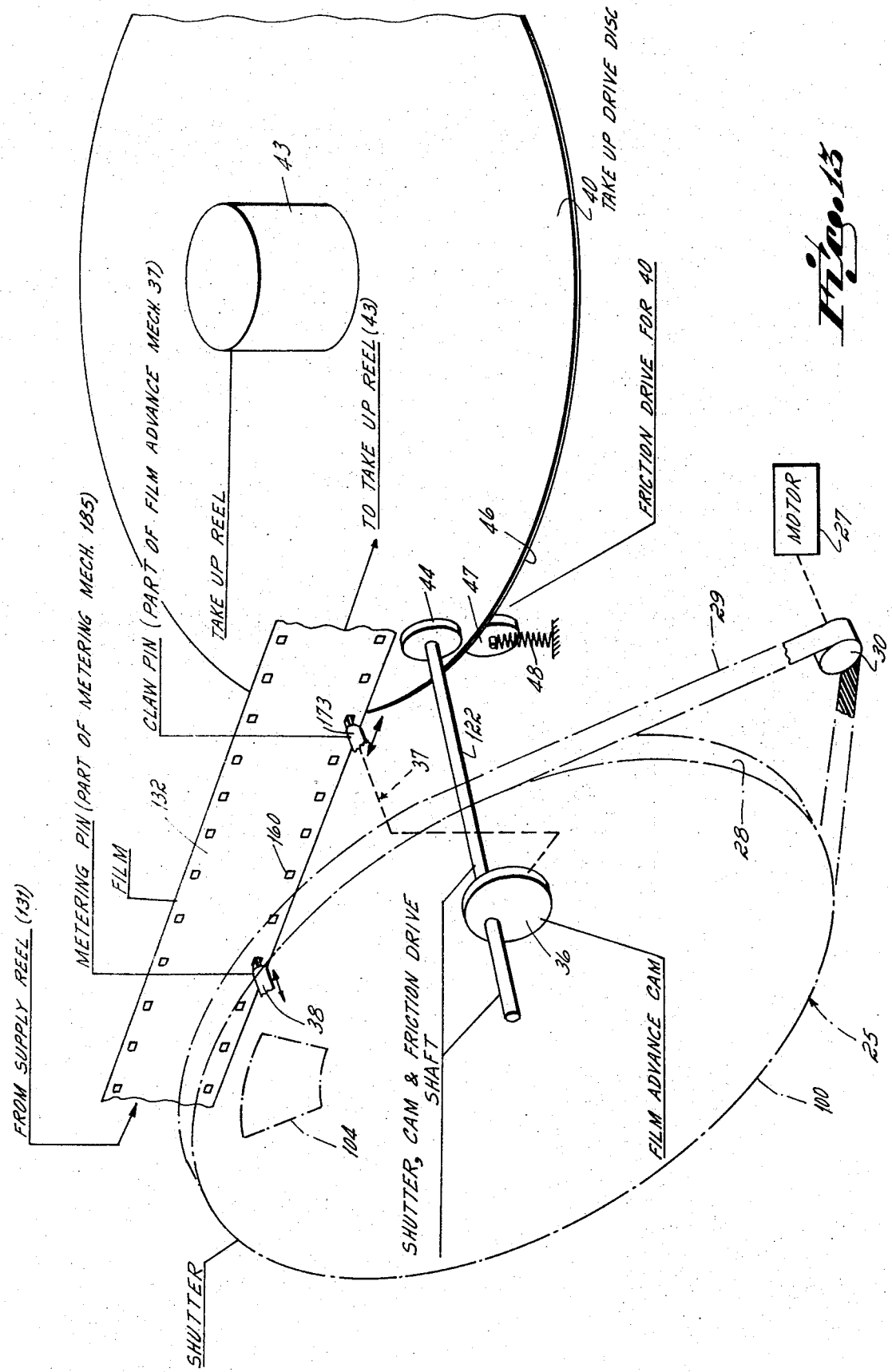

CASSETTE TYPE SEQUENCE CAMERA

This invention relates to a camera and particularly to a sequence camera for use in surveillance work.

In banks and other commercial establishments, it is desirable to provide a camera directed to critical areas such as tellers' stations to photograph the activity at such stations. Typically, such a camera will make an exposure at predetermined intervals such as every 15, 30 or 60 seconds to obtain a photographic record of the persons doing business at the critical stations so that in the event of a robbery, it will be possible to identify the robber and circulate his picture until he is apprehended.

The control circuits for such cameras normally provide for the taking of pictures at a much more rapid rate as, for example, four frames per second. Such an operation is initiated by a teller operating a hidden switch during the course of a robbery so that a number of photographs can be taken. One such camera is disclosed in Novak U.S. Pat. No. 3,429,245.

The camera of the Novak patent utilizes a 35 mm. roll of film which is normally provided on a supply reel and which must be threaded past a sprocket and onto a take-up reel when the camera is loaded. That camera is a very satisfactory, reliable work horse in the surveillance field but suffers the disadvantage of requiring the high cost of 35mm. film as well as the requirement of threading film from a supply reel through the camera each time the camera is loaded.

It has been an objective of the present invention to provide a camera which is an improvement over the camera in the Novak U.S. Pat. No. 3,429,245 in several areas, particularly those of economy and simplicity of construction and operation.

In attaining this objective, it has been a feature of the invention to provide a camera adapted to receive a 16mm. film in a disposable cassette of the type described in the copending application entitled FILM CASSETTE filed in the name of Warren D. Novak of even date herewith. The cassette design, which per se forms no part of the present invention, provides a greater capacity, enabling the camera to expose in excess of 10,000 frames in one loading of the camera. The cassette and camera combination also greatly simplifies the loading and handling of the film by the banker.

Another objective of the invention has been to provide for the exposure across the entire width of the film, thereby achieving full utilization of the photosensitive area of the film.

It has been another objective of the invention to provide a simple and compact operating mechanism for the camera. The shutter structure and operation is one of the simplified features of the camera. A circular rotary shutter is mounted adjacent the camera lens and its periphery forms a pulley wheel over which passes a belt driven by a motor mounted adjacent the rotary shutter. All of the operations such as film advance and film take up are driven off the rotary shutter, thus simplifying the drive system for the camera.

As a further simplification, instead of the sprocket and claw mechanism normally used for film advance, the present invention provides a pin functioning as a claw tip, the pin being spring-biased toward the film and mounted in a block which is reciprocated by a cam which rotates with the film shutter. The pin is adapted to drop into each slot in the film and has one face squared off in the direction of the film advance to engage and advance the film and the opposite face curved to enable the pin to cam itself out of the film slot on the return stroke of the carrying block. A flyweight bias on the pin coupled with the use of a plastic pin permits the pin to pass over the surface of the film without scratching and thus obliterating part of the image.

Cooperating with the film advance mechanism is a supply reel take-up mechanism which also forms one of the simplified features of the invention. A drive disc, having a spindle engageable with the take-up reel of the cassette, is rotatably mounted in the camera housing and has its perimeter passing adjacent the rotary shutter. The rotary shutter carries a friction wheel which engages one surface of the drive disc at its perimeter, and on the opposite side an adjustable spring-loaded pinch roller engages the drive disc. The frictional driving force of the friction wheel and pinch roller on the drive disc is insufficient to overcome the total frictional forces of the supply reel, take-up reel and film passing through the pressure plate in the gate of the cassette. However, when the film is positively advanced by the claw described above, the frictional force on the drive disc is great enough to rotate the take-up reel in the cassette to take up each frame as it is exposed and advanced by the advance mechanism.

Another objective of the invention has been to provide for a simplified adjustment of the aperture of the rotary shutter. The rotary shutter has an aperture and a thin shutter blade in the form of a disc is mounted on the rotary shutter, the blade being angularly adjustable with respect to the rotary shutter. The extent to which the respective apertures are in full or partial alignment determines the amount of light entering the camera as the shutter rotates. The shutter blade has an arcuate slot adjacent its periphery to define a thin strip which provides a resilient detent engageable into a selected one of a plurality of spaced recesses in a cooperating flange around the periphery of the rotary shutter. The detent can be pulled out of the recess by the fingernail of the operator and the shutter blade rotated to another detent position to change the shutter opening.

Another objective of the invention has been to provide a control or metering contact operator similar to the claw pin of the advancing mechanism described above. More specifically, a pin, like the claw tip previously described, is mounted on an adjustable block and is spring-biased to project toward the film and lies in the path of the film advance slots. A spring wire which biases the pin also forms a movable contact. As the film passes by the pin, it holds the spring contact out of engagement with a cooperating fixed contact. When a film advance slot passes by the pin, the pin drops into the slot enabling the contacts to close. The contacts may control several functions in the control circuit, such as counting the frames exposed and producing the intermittent motor operation when the camera is set for automatic frame-by-frame operation with predetermined intervals between each exposure.

These and other objectives of the invention will become more readily apparent from the following detailed description taken in conjunction with the accompanying drawings in which:

FIG. 1 is a perspective view of the camera;

FIG. 2 is a cross-sectional view taken along lines 2—2 of FIG. 1;

FIG. 3 is a cross-sectional view of the camera taken along lines 3—3 of FIG. 2;

FIG. 4 is a cross-sectioanl view of the camera taken along lines 4—4 of FIG. 2;

FIG. 5 is an enlarged fragmentary cross-sectional view taken generally along lines 4—4 of FIG. 2;

FIG. 13 is a diagrammatic perspective view of the main operating elements of the camera.

GENERAL ORGANIZATION

Figure 6:
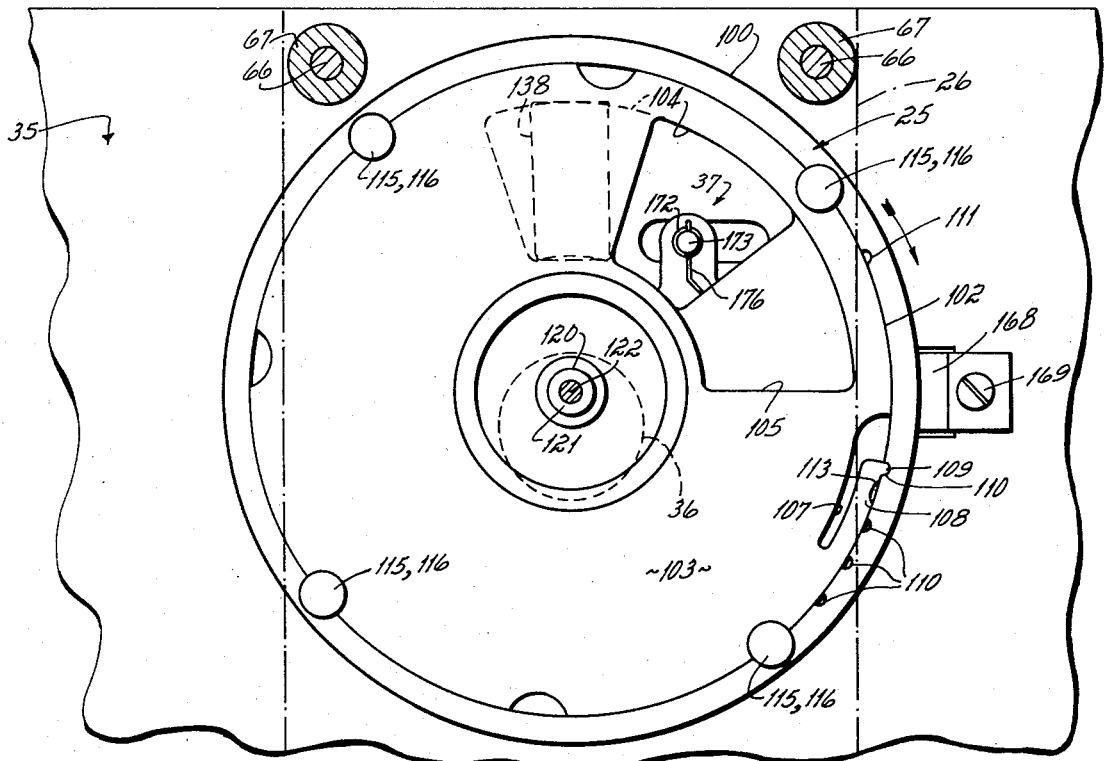
FIG. 6 is a cross-sectional view taken along lines 6—6 of FIG. 5.

The camera indicated at 20 in FIGS. 1 and 4 has a housing 21 which includes a nose cone 22 and a cassette receiving chamber 23. A door 24 which is pivoted to the housing is adapted to be swung open to make chamber 23 accessible for the insertion and removal of a cassette. A circular shutter 25 is rotatably mounted on a lens plate 26 and is driven by a motor 27. The circular shutter or pulley has a peripheral pulley groove 28 which is engageable by a belt 29 which passes around a pulley 30 driven by the motor 27. An aperture plate 35 is mounted in the housing 21 adjacent to the shutter 25. The aperture plate 35 carries the film advance mechanism 37 and metering pin 38 (FIGS. 7 and 13), as will be described hereinafter. The film advance mechanism is driven by a cam 36 which is integral with the rotary shutter 25 (see FIG. 5).

Film take-up mechanism for the cassette includes a drive disc 40 having a spindle 41 projecting into a cassette 42 into engagement with the lower take-up reel 43 of the cassette. The drive disc 40 is engaged by a friction wheel 44 which is coaxial with the shutter 25 and rotates with the shutter. The drive disc 40 is engaged on the opposite surface 46 by a pinch roller 47 which is biased by a spring 48 to press the drive disc 40 against the friction wheel 44.

The general organization and operating relationship of the elements in the camera are illustrated in FIG. 13. At intervals determined by the control circuit, the operation of the camera is initiated to energize the motor 27 over a sufficient period of time to rotate the shutter 25 through one revolution. As the shutter rotates, the cam 36 causes the film advance mechanism 37 to move the film one frame, a distance of 0.300 inch. When the film is at rest, the shutter aperture passes by the film and exposes a frame. The movement of the film past the metering pin operates a contact associated with the control circuit to operate a counter and to initiate the dynamic braking of the motor in the control circuit to stop the motor and reset the time circuit for the next operation.

During the increment of the cycle when the advancing mechanism is advancing the film, the friction wheel 44 drives the drive disc 40 to rotate the take-up reel 43 a sufficient distance to wind a length of film corresponding to the previously exposed frame. Actually, the drive disc rotates a greater distance; however, after it has taken up all of the slack, the friction wheel slips on the drive disc, for the frictional force of the friction wheel 44 on the drive disc 40 is not sufficiently great to advance the film except during the period when the drag on the film is overcome by the film advance mechanism.

THE HOUSING

As shown in FIGS. 2 and 3, the housing has a front wall 50 with which the nose cone 22 is integral, side walls 51, a semi-cylindrical back wall 52, a bottom wall 53 and a top wall 54, the major portion of which being formed by the door 24. A ball and socket mounting 59 is secured to a chassis 55 and protrudes through the side wall 51 for mounting and aiming the camera at the desired station.

The chassis 55 is secured by bolts 56 passing through bosses 57 to four posts 58 adjacent the side walls 51. The chassis 55 carries all of the main operating elements which can be assembled as a unit and mounted in the housing by mounting the chassis to the housing. In the orientation illustrated in FIGS. 2–5, the chassis includes a horizontal plate 60 to which is secured the vertical aperture plate 35. The chassis 55 also has upstanding side walls 63 which carry the bosses 57 and a horizontal plate or bottom wall 64 which define the cassette receiving chamber 23 and support the cassette when it is in place as shown in FIG. 5. A U-shaped bracket 65 (FIG. 3) mounted on an inward bolt 56 frictionally captures the cassette and secures it in place.

The motor 27 is mounted on the rearward side of the aperture plate 35. The lens plate 26 is mounted on the forward side of the vertical plate 35 by bolts 66 and spaced from the aperture plate by bosses 67 so as to provide a space within which the shutter 25 rotates.

Referring to FIG. 4, the door 24 is mounted on the housing by a hinge 70. The hinge includes a strap 71 mounted to a hinge plate 72 which is bolted to the front wall of the housing on posts (FIG. 2) and connected by a pintle 73 to a door hinge bracket 74 which is bolted to the door 24. The cassette is retained within the housing by surrounding the film advance mechanism 37 at its forward end and by a clipped spring 75 secured to plate 64 at its rearward end. The front wall 50 carries posts 76 which are in turn secured to aperture plate 35 by screws 77. By removing screws 77, the front wall 50 and door 24 may be removed as a complete assembly.

A light seal 79 having an aperture 80 is mounted on the hinge plate 72 to partially occlude the opening 81 in the hinge plate. A retainer 83 is secured by bolts 84 to the hinge plate, sandwiching the seal therebetween. In assembly, the bolts 84 are turned down to squeeze the seal between the retainer and the hinge plate to extrude it outwardly into a light tight sealing engagement with the internal surface of the nose cone 22.

The lens plate 26 has an aperture 85 having a shoulder 86 around its periphery into which the lens 87 is seated. The lens may be seated against the shoulder 86, for example, by a threaded connection to the aperture 85.

THE ROTARY SHUTTER

As shown in FIGS. 5 and 6, the rotary shutter 25 is circular, its perimeter 100 being formed with a groove to receive the belt 29. A forwardly projecting shoulder or flange 102 around the perimeter of the shutter forms a seat to receive a washer-like thin shutter blade 103. The shutter has an arcuate aperture 104, and the shutter blade 103 has an identical arcuate aperture 105 which is alignable with the shutter aperture 104.

The shutter blade has an arcuate slot 107 adjacent its edge to form a detent strip 108 having a detent 109. The flange 102 of the rotary shutter has four spaced recesses 110 which are selectively engageable by the detent 109 to fix the blade in its selected angular position with respect to the rotary shutter to determine the time of exposure of the film. A fifth recess 111 is provided and is engageable by the detent 109 when the shutter is in a full open condition.

The strip 108 is flexible enough that it can be bent slightly radially inwardly by applying a tool or fingernail to a groove 113 in the strip. The strip is accessible alongside the lens plate 26 from the front of the camera when the front wall of the camera is removed in order to make the adjustment.

The shutter blade 103 is mounted on the rotary shutter by four pins 115 driven into the perimeter of the shutter, the pins having overhanging heads 116 which retain the blade in the shallow recess of the rotary shutter created by the flange 102.

The shutter has a central bore 120 (FIG. 5) into which a bearing sleeve 121 is press fitted. The bearing sleeve is rotatably mounted on a stub shaft 122 which is fixed in the lens plate 26 at one end and at the other end is secured to a channel-shaped bracket 123 which is bolted to the vertical aperture plate 35. The friction wheel 44 is fixed to the sleeve 121 and rotated with the sleeve as the rotary shutter rotates.

The cam 36 is molded integrally with the rotary shutter and is circular, the cam being eccentrically located with respect to the axis of the rotary shutter. The centers of the cam and rotary shutter are spaced apart by a distance equal to one-half the frame length so that the throw of the film advancing mechanism engaged by the cam is equal to the length of a frame.

TAKE-UP REEL DRIVE

As best shown in FIG. 5, the take-up reel 43 of the cassette 42 has a square opening 130 adapted to receive the square drive pin or spindle 41 driven by the drive disc 40. The film taken up by the reel 43 is unwound from a supply reel 131 which is side by side and coaxial with the take-up reel 43. The cassette is fully described in copending application Ser. No. 360,360, filed May 14, 1973, and it should suffice to point out that the film indicated at 132 at the front of the cassette passes from the supply reel past a gate 133 which includes a pressure plate 134 which is urged by a spring 135 against the front wall of the cassette which forms an aperture 137 in the cassette. The aperture 137 is aligned with aperture 138 in the aperture plate. The film passes from the gate around a curved path and downwardly onto the take-up reel.

The spindle 41 has a shoulder 139 which is slidable and rotatable in a bearing cup 140. The bearing cup has a hole 141 in the bottom of it through which a pin 142 forming a lower extension of the spindle 41 rides. A compression spring 143 bears against the bottom of the cup 140 at one end and against the shoulder of the spindle at the other end to urge the drive pin up out of the cup. The slidable spindle permits the spindle to be depressed into the bearing cup when the cassette is slid into position in the housing and to snap into engagement into the square hole 130 in the take-up reel when the cassette is properly seated. The shoulder 139 of the spindle engages the lower surface of the drive disc 40, the drive disc having a square hole through which the spindle 41 passes so that rotation of the drive disc will rotate the spindle. An anti-friction washer 145 is interposed between the drive disc 40 and the bottom wall 64 of the chassis.

The pinch roller 47 is rotatably mounted in a U-shaped bracket 150 which is pivoted as at 151 laterally and slightly below the axis of the pinch roller to the aperture plate 35. A rivet 152 projects through the bottom of the U-shaped bracket and receives the upper end of the compression spring 48. An adjusting screw 154 is secured to a bracket mounted on the aperture plate 35 by lock nuts 155 and bears against the lower end of the compression spring 48. By adjusting the screw 154, the spring 48 may be compressed or expanded to vary the pressure of the pinch roller 47 on the drive disc 40. The pressure is adjusted so that the frictional force of the rotating friction wheel on the drive disc is normally not enough to overcome the frictional resistance of the film to movement in the advancement direction, but is great enough to rotate the drive disc and take-up reel when the film is positively pulled from the cassette by the film advancing mechanism.

FILM ADVANCING MECHANISM

Figure 7:
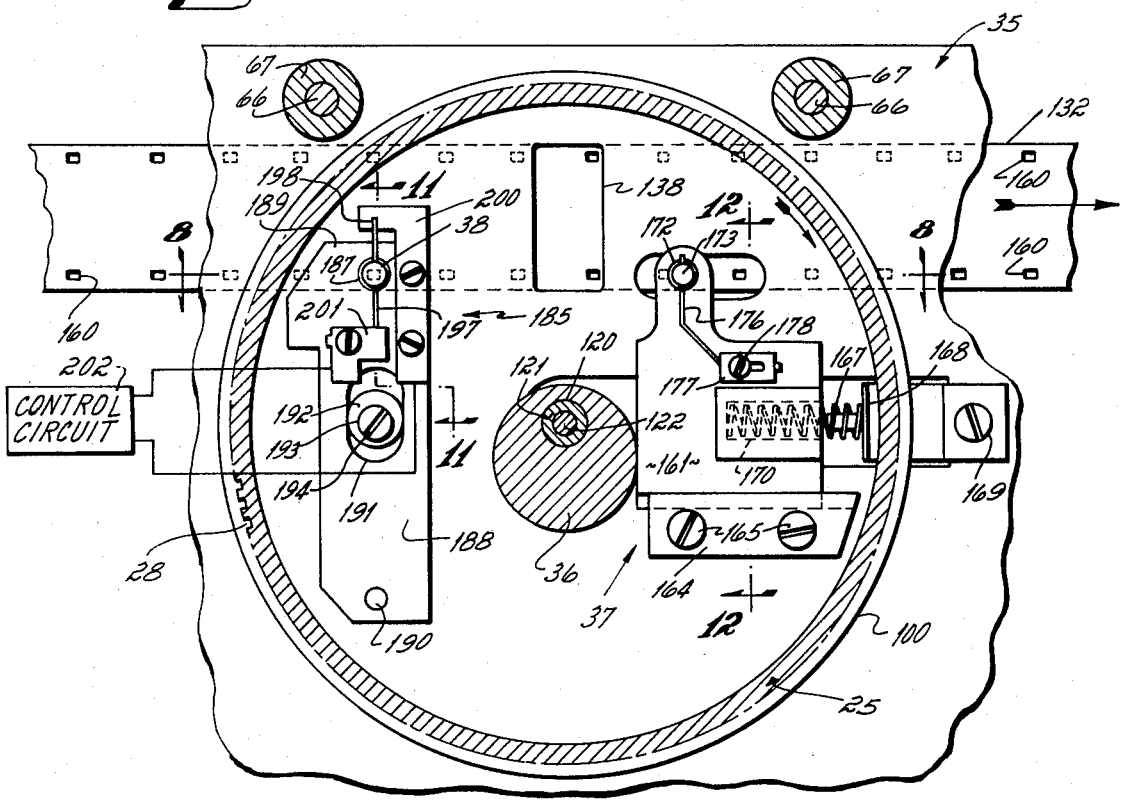
FIG. 7 is a cross-sectional view taken along lines 7—7 of FIG. 5.

Referring to FIG. 7, the film 132 moves in the direction of the arrow past the aperture 138 in the aperture plate 35. The film which in the preferred embodiment is 16mm. film has a series of spaced slots 160 of the type normally engaged by sprockets in conventional cameras. The slots are spaced apart on centers of 0.300 inch, although the spacing could vary depending upon aperture size, lenses and other structural characteristics of the camera. The film advance mechanism 37 must advance the film by a distance of one frame for each cycle of operation, that distance being 0.300 inch.

Figure 12:
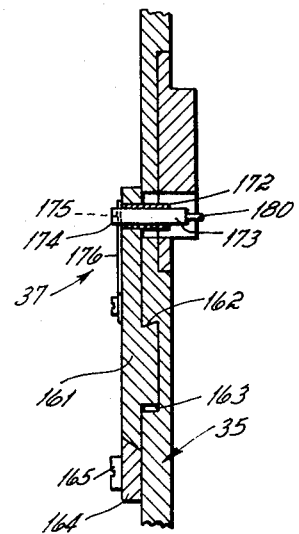
FIG. 12 is a cross-sectional view taken along lines 12—12 of FIG. 7.

The film advance mechanism includes a block 161 which is slidable on the aperture plate 35, the block having a mating dovetail configuration with the plate indicated at 162 in FIG. 12. The dovetail 162 mates with a groove 163 in the plate and is held in groove by a beveled strap 164 secured by screws 165 to the plate 35. The block 161 is urged by a compression spring 167 toward the cam 36. The spring has one end in engagement with a bracket 168 fixed by a screw 169 to the plate 35. The other end of the spring engages the bottom of a bore 170 formed in the block 161. As the cam 36 rotates, due to the rotation of the rotary shutter 25, the block is moved toward the right or film advance direction as the high point of the cam moves into engagement with the block, and is urged in a return direction by the spring as the low point of the cam moves into engagement with the block. The cam 36 is circular so as to impart a simple sine wave motion to the block which is desirable in view of the manner in which the claw engages and disengages itself from the slots 160, as will be described below. The center of the cam 36 is spaced from the axis of the rotary shutter by one-half the space between frames or 0.150 inch to produce a throw of 0.300 inch.

The block 161 has a tube 172 projecting transversely through it, the tube overlying the path of the film slots 160 as the film is advanced. A claw pin 173 is slidably mounted in the tube. The claw pin has, at its outer end 174, a transverse hole 175 which receives a spring wire 176. The spring wire is anchored to the block 161 by a clamp 177 secured to the block by a screw 178. The spring wire 176 is of the order of 0.006 inch diameter and thus imparts only a flyweight pressure to the pin 173. The cross hole is slightly larger than the pin diameter as, for example, 0.002 inch larger, thereby permitting the pin to rotate very slightly, that is, through an angle of 2°–4°, to enable it to accommodate itself to the slot surface in the film.

Figure 8:
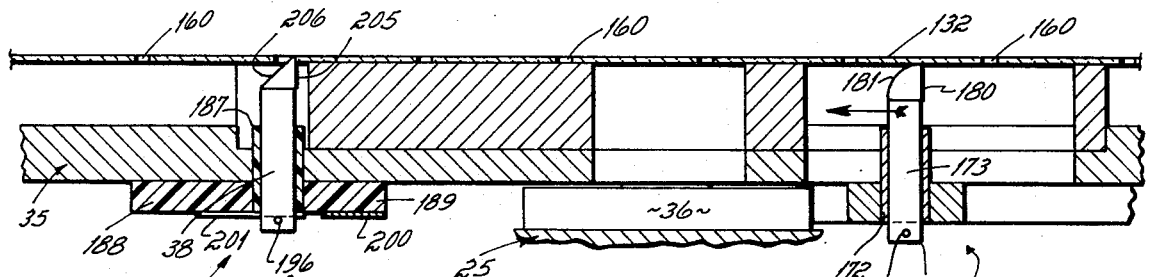
FIGS. 8, 9 and 10 are fragmentary cross-sectional views taken along lines 8—8 of FIG. 7 illustrating the operation of the film advance claw and metering claw.
Figure 9:
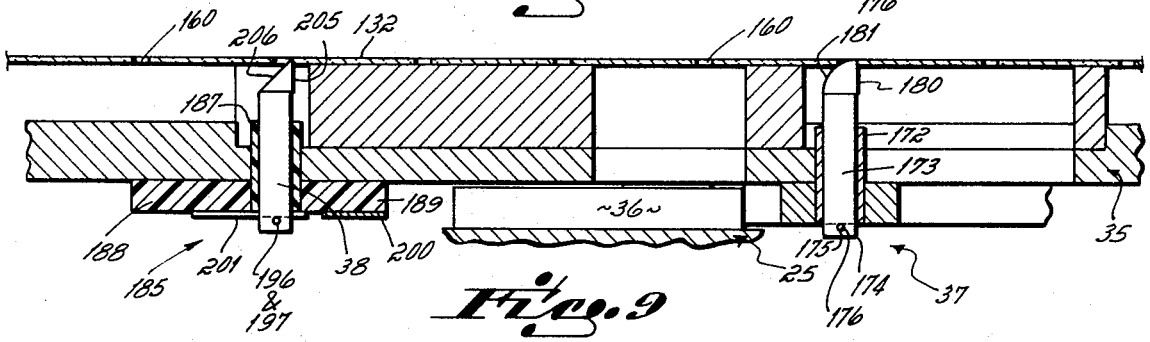
Figure 10:
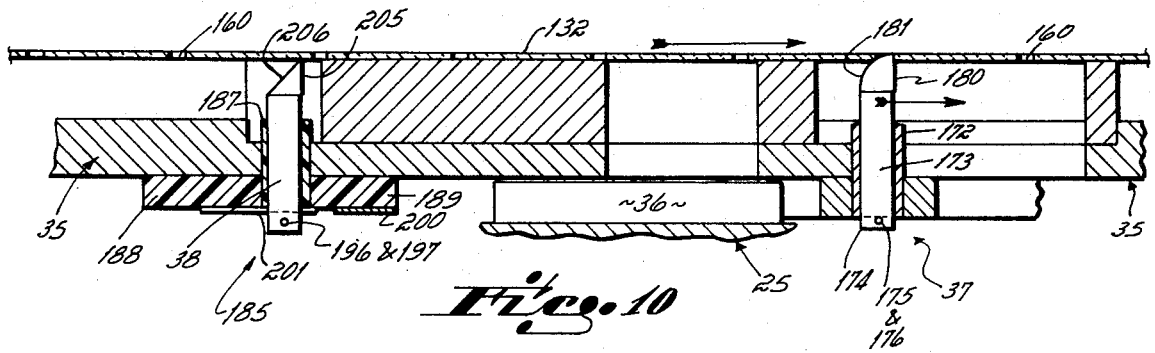

As best shown in FIGS. 8–10, the pin 173 has a squared-off or flat face 180 in the direction of the film advance, the opposite face 181 being generated as a quarter arc of a circle. In the preferred embodiment, the arc of the circle is approximately 0.125 inch radius. The length of each slot in 160 is approximately 0.050 inch so it can be seen that as the pin moves into a slot, its depth of projection into the slot will be very slight, as shown in FIGS. 9 and 10, the trailing edge of the slot resting on a gradual slope at the tip of the pin.

In FIG. 8, the return stroke of the mechanism is illustrated. The rotation of the cam 36, coupled with the return spring pressure, causes the block 161 to move in the return direction (leftward) until, at the end of the return stroke, as shown in FIG. 9, the pin drops into the slot 160.

On the advance stroke, which begins as illustrated in FIG. 9, the flat surface 180 engages the leading slot edge to thrust the film forward by a longitudinal distance equal to one frame of 0.300 inch. At the end of the stroke an exposure is made across the entire width of the film, the exposure being made as the pin begins its return stroke. During the beginning of the return stroke, the trailing edge of the slot 160 cams the pin, against the light pressure of the spring 176, away from the film so that the pin rides out of the slot 160 as the slide block begins its movement in the return direction. Because of the sine wave motion of the block 161, the movement of the block and pin is quite gradual at each end of the return stroke where the pin engages the slot 160 and at the beginning of the advance stroke where the pin disengages the slot 160, thereby providing additional assurance of a proper engagement and disengagement of the pin with the slot. Further, the sine wave configuration of the surface 181 provides a very gradual slope where the pin engages the trailing edge of the slot so that the camming of the pin out of the slot is very gradual. These factors, coupled with the fact that the pin is made of plastic without sharp protuberances, and the very light pressure applied by the spring 176 substantially eliminates any possibility of scratching of the film or jarring of the film by the film advance mechanism.

The film advance mechanism as described, coupled with the film take-up mechanism, permits the elimination of a sprocket for the control of the film. The elimination of the sprocket tends to minimize the number of slots required in the film so that exposing the entire width of the film is meaningful in that the image is not interrupted by the plurality of sprocket holes.

THE METERING MECHANISM

Figure 11:
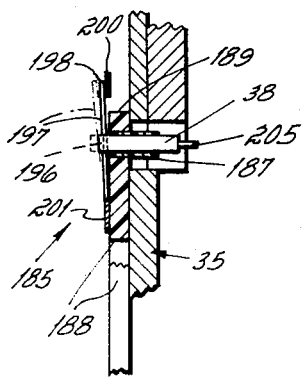
FIG. 11 is a cross-sectional view taken along lines 11—11 of FIG. 7.

The metering mechanism illustrated in FIGS. 7 and 11 and indicated at 185 is similar in some respects to the film advance mechanism in that it employs a metering pin 38 which is similar to the claw pin 173 and is engageable with a slot 160 in the film. The metering pin, however, in normal operation does not reciprocate longitudinally but remains in a fixed longitudinal position to which it is adjusted, as will appear below. The pin 38 is transversely slidable in a tube 187, the tube 187 being fixed in a block 188 which is adjustably mounted on the aperture plate 35 within the confines of the rotary shutter. The block 188 is elongated, the pin being located at one end 189 and the other end being pivoted at 190 to the aperture plate. Intermediate the ends of the block is an elongated slot 191 which receives a circular cam 192, the cam being eccentrically mounted on the aperture plate 35 for rotary movement about the axis of a shaft 193 to which it is fixed. When the shaft 193 is rotated as by applying a screw driver to a slot 194, the cam 192 drives the block to swing clockwise or counterclockwise about its pivot 190 to change the longitudinal position of the metering pin 38 to be sure that it passes completely through the slot 160 to close its contacts. The lateral position of the pin will also change, but that change is so slight because of the length of the radius about which the pin swings is so great that the lateral change is inconsequential.

The metering pin has a bore 196 through the end which projects through the block, the bore receiving a spring wire 197 which resiliently urges the pin toward the film. The bore in the pin is slightly larger than the spring wire, as described in connection with the claw pin 173, so as to provide the slight rotary accommodation of the pin to the film slot. The pressure applied by the spring wire is of the same order of magnitude as that of the claw biasing wire 176 to provide a flyweight engagement of the metering pin with the film.

The spring wire is gold plated at at least its free end 198, that free end being engageable with a fixed contact 200. The other end of the spring wire is connected to a terminal 201, the terminal 201 and fixed contact 200 being connected to a control circuit 202.

As shown in FIGS. 8–10, the pin 38 has at its tip a squared-off or flat surface 205 facing in the direction of the advance of the film and an inclined surface 206 facing in the opposite direction.

In the operation of the metering mechanism, the film in its advance, from the position of FIG. 9, engages the inclined surface 206 and cams it and the pin 38 away from the film, as shown in FIG. 10. The film continues to advance until the end of the stroke of the advancing mechanism at which point the pin drops into the next succeeding slot 160 in the film. There is some criticality in the timing of the operation of the metering switch, the contacts 197 and 200 of which are closed by the dropping of the pin into the slot. Hence, the need for a minor longitudinal adjustment of the position of the pin 38.

The control circuit 202 may be of any design well within the capability of a person skilled in the art, the design depending on how it is desired to cycle the operation of the camera. It may, for example, include a timer and a frame counter and operate generally as follows.

Upon initiation of the operation of the camera by means of a pulse to the control circuit, the camera goes through its cycle and stops again. That cycle consists of the film drive claw 173 pulling the first sprocket hole the length of a frame. The metering pin 38 is cammed out of its sprocket hole as soon as the film moves, and a film motion switch consisting of the contacts 197, 200, in the control circuit, opens. When the film drive claw 173 has pulled the film for one complete frame length, the metering pin 38 enters the next succeeding sprocket hole and closes the film motion switch. The closing of that switch initiates a delay time during which the motor continues to run in order to cause the exposure of the film and thereafter the motor is dynamically braked. The closing of the switch also provides a drive to the frame counter and registers that one frame has been exposed.

The start pulse for the camera may come from any source as, for example, a door switch, a switch on a check cashing device or the like. The circuit may also contain a pulse generator with an adjustable interval, enabling the camera to be automatically sequenced for taking one picture every predetermined interval. The control circuit might also include an oscillator for generating, for example, four pulses per second to cause four exposures per second during a burglary.

OPERATION

The camera is mounted in the proper position and the lens directed toward the location to be photographed. Sighting is done by applying the optical viewing device temporarily in the camera with the shutter at full open position, the shutter aperture overlying the aperture 138 in the aperture plate.

In the operation of the invention, the lighting conditions of the establishment in which it is to be used are determined and a shutter adjustment is made depending upon the conditions. The adjustment is made by removing the front wall of the housing and with a tool or fingernail inwardly depressing the strip 108 to move the detent 109 out of the recess 110 in the peripheral flange of the rotary shutter and angularly shifting the position of the shutter blade to the desired shutter speed, e.g., 1/45, 1/60, 1/90, 1/125 and 1/250 of a second.

With the optical viewing mechanism removed, a cassette of film is inserted into the camera, the door is closed, and the control circuit is energized. The control circuit will initiate the operation of the camera by energizing the motor 27 for a cycle of operations as determined by the metering pin 38 and contacts associated with it. More specifically, the motor is energized and remains energized until a signal, received from the metering pin contacts, initiates a dynamic braking of the motor.

At the beginning of a cycle, the shutter opening 104 is in the position illustrated in FIG. 6 with respect to the aperture 138 in the aperture plate. As the shutter begins to rotate, it rotates the friction wheel 44 which advances the drive disc until the slack in the film created by the advance of the film is taken up by the take-up reel 43. Thereafter, the friction wheel 44 will continue to rotate but will slip with respect to the friction disc which remains stationary until the next advance of film.

Simultaneously, the cam 36 rotates causing the low spot on the cam to be brought into contact with the slide block 161. During the first approximately 180° of rotation, the spring 167 urges the slide block 161 toward the left as viewed in FIG. 7, being the return stroke of the advance mechanism. At the extreme end of the return stroke of the advancing mechanism, the claw pin 173 drops into the next succeeding slot 160 in the film to the extent indicated in FIG. 9. As rotation of the cam 36 is continued, the claw pin 173 is advanced with its flat surface 180 in engagement with the leading edge of the slot 160 to drive the film forward, the drive disc taking up the film slack as it is created. As soon as the film begins its forward advance, the slot 160 into which the metering pin 38 is received begins to cam the tip of the pin 38 away from the plane of the film and out of the slot 160.

Rotation of the rotary shutter continues through the end of the advance mechanism stroke bringing the shutter opening 104 to a position adjacent, but not yet overlying, the aperture 138 in the aperture plate. At about that instant, the metering pin 38 drops into the next succeeding slot 160, thereby closing the contacts to the control circuit, causing a count of an exposed frame to be made and to initiate the dynamic braking of the shutter. Before braking is completed, rotation to the end of the cycle, as shown in FIG. 6, is completed during which segment of rotation the shutter opening passes by the aperture opening 138 to make an exposure. After dynamic braking, the rotary shutter stops at the position of FIG. 6, the control circuit times out a preselected interval as, for example, 15 seconds, and then initiates another operation.

I claim:
1. A camera comprising,
    a housing,
    a lens mounted in said housing,
    said housing having a chamber adapted to receive a cassette having film exposed at one side thereof adjacent said lens,
    a rotary shutter mounted in said housing between said lens and said chamber,
    a motor mounted in said housing and drivably connected to said shutter,
    a film advance mechanism mounted in said housing adjacent said lens and operably connected to said shutter to advance said film intermittently as said shutter rotates,
    a drive disc rotatably mounted in said housing in a plane perpendicular to the plane of rotation of said shutter,
    a spindle on said drive disc projecting into said chamber and connectable to a cassette,
    a friction wheel carried by said shutter and rotatable therewith, said friction wheel engaging one surface of said drive disc,
    and a pinch roller mounted in said housing and engageable with the opposite surface of said drive disc adjacent said friction wheel.
2. A camera as in claim 1 further comprising,
    a bearing for said pinch roller slidably mounted in said housing for movement toward and away from said drive disc,
    a spring urging said pinch roller toward said drive disc, and
    means for adjusting the force of said spring on said pinch roller.
3. A camera comprising,
    a housing,
    a lens mounted in said housing, means for supplying film past said lens, said means including a drive disc rotatably mounted in said housing, a rotary shutter mounted in said housing between said lens and said film supplying means and being fixed to a shaft located adjacent said drive disc, a motor mounted in said housing and drivably connected to said shutter shaft, and a friction wheel coaxial with said shutter shaft and rotatable therewith, said friction wheel drivably engaging said drive disc.

4. A camera as in claim 3 further comprising, means for receiving a film cassette in said housing, said film cassette having a take-up reel, and means connecting said drive disc to said take-up reel.

5. In a camera having a housing, a drive system for film on a reel in a cassette having frictional resistance to the advancement of the film, said camera comprising, a drive disc rotatably mounted in said housing and having a coaxial spindle connectable to said reel, a rotatable friction wheel engaging one surface of said drive disc, a pinch roller engaging the opposite surface of said drive disc adjacent said friction wheel, means for rotating said friction wheel as film is advanced through said camera, a film advance mechanism operable to advance said film frame-by-frame toward said reel, and means for applying pressure to force said pinch roller against said disc, said pressure being insufficient to overcome said frictional resistance to the advancement of film and being sufficient to drive said drive disc only when said film is moved by said film advance mechanism.

* * * * *